April 14, 1931. P. LEONARD 1,800,393
COMBINATION AIR CHUCK AND GAUGE
Filed July 18, 1925
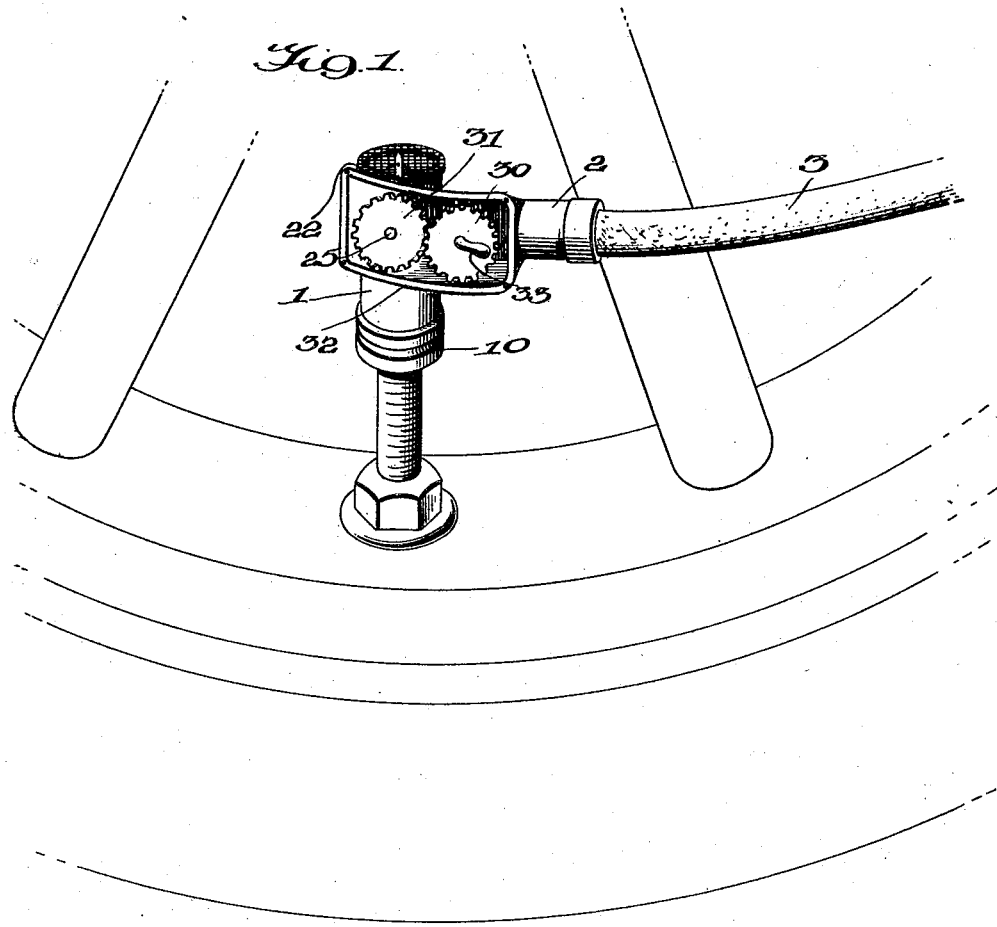
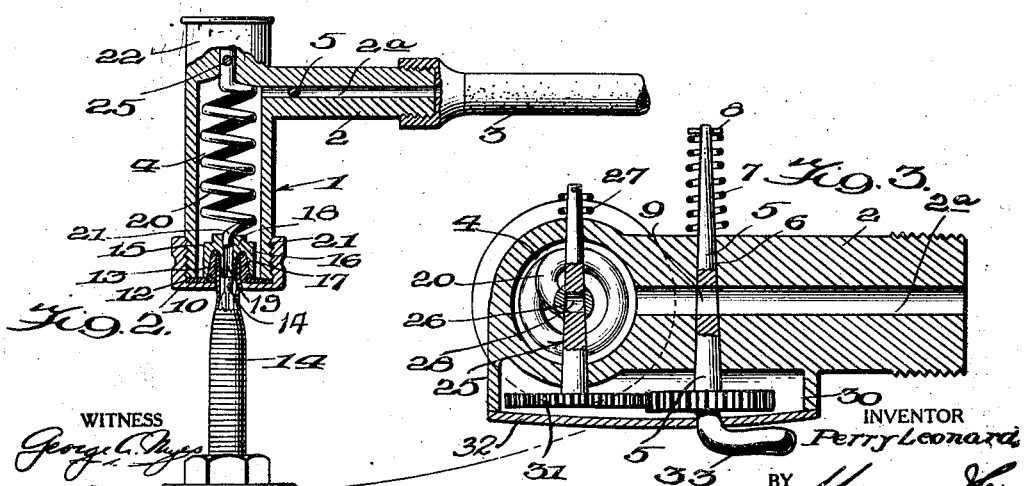

Patented Apr. 14, 1931

1,800,393

UNITED STATES PATENT OFFICE

PERRY LEONARD, OF EFFINGHAM, KANSAS

COMBINATION AIR CHUCK AND GAUGE

Application filed July 18, 1925. Serial No. 44,570.

This invention relates to a combination air chuck and gauge, and has for its object the provision of a device of this character especially designed for use in inflating pneumatic tires and gauging the pressure in such tires.

Another object resides in the provision of a combination air chuck and gauge of this character and which may be readily and easily manipulated to afford a gauge reading of the amount of pressure in the tire at any time during the delivering operation and without the necessity of removing the chuck from the valve stem of the pneumatic tire.

A further object is to provide a combination air chuck and valve having these advantages and capacities and which is so constructed and organized that the gauge is never subjected to the full shock of air line pressure.

A still further object resides in the provision of a combination air chuck and gauge of the character specified and which is of simple and durable construction, reliable and accurate in operation, easy and comparatively inexpensive to manufacture and not liable to get out of order or to require repairs, replacements, or adjustments.

Other objects and advantages reside in certain novel features of the construction, arrangement and combination of parts which will be hereinafter more fully described and particularly pointed out in the appended claim, reference being had to the accompanying drawings forming a part of this specifiation, and in which:

Figure 1 is a perspective view showing the combination air chuck and gauge applied to the valve stem of a pneumatic tire, Figure 2 is a view showing the air chuck and gauge in vertical section, and Figure 3 is a view showing the same in horizontal section.

Referring to the drawings, the numeral 1 designates the hollow body of the chuck which is provided with a nipple 2 to which the air line 3 is connected. The hollow body 1 has a chamber 4 therein and this chamber communicates with the air line 3 under the control of the rotatable plug valve 5 of conical form and rotatably fitted in a correspondingly formed transverse opening 6 provided in the nipple 2. The valve 5 is held in snug engagement with the wall of its opening 6 by means of a coil spring 7 having one end engaging the nipple and the other end engaging a pin 8 or other suitable fastening means carried by the valve 5. The valve 5 has a port 9 therein which registers with the bore 2a of the nipple 2 in one position of the valve but which may be turned to position out of register with the bore 2a to block the bore 2a for a purpose which will hereinafter more fully appear.

A cap 10 is threaded on the hollow body 1 and has a central opening 11. A packing member or gasket 12 is carried by the cap and has a portion 13 of frusto-conical form designed to engage the valve stem of the tire valve 14 and effectively pack the same. A valve 15 is mounted within the hollow body 1 and includes a sleeve 16 formed with a tapered or frusto-conical inner wall 17 designed to co-act with the inner portion of the gasket 12 to prevent the escape of air when the valve 15 is seated on the gasket and the tire valve opened. At its inner end the sleeve 16 is closed by an end wall 18 so that the pressure of the spring 20 is effective to seat the valve 15. A stud 19 is integrally formed with the end wall 18 of the valve 15 and this stud projects down through the gasket and is adapted to engage the valve stem of the tire valve to open the tire valve. The valve 15 is unseated by virtue of the engagement of the stud 19 with the tire valve stem and also by virtue of the engagement of the end wall 18 with the outer end of the barrel of the tire valve.

A coiled tubular member 20 is provided in the hollow body 1 and has one end thereof straightened out, as indicated at 21, and extended through an opening formed in the stud 19. The other end of the coiled tubular member 20 is connected with an air gauge 22 suitably fixed or mounted on the top of the hollow body 1. The tubular member 20 serves to convey fluid pressure from the tire to the gauge as will hereinafter more clearly appear and is also elastic and resilient and it is tensioned to yieldably hold the valve 15 seated against the gasket 12.

For the purpose of controlling the operation of the gauge a tapered or conical valve 25 is provided and extends through an opening 26 formed in the tubular member 20 at a point adjacent its connection with the gauge 22. This valve 25 is held in snug engagement with the wall of its opening 26 by means of a coil spring 27 but it is to be understood that the valve 25 is rotatable in the opening 26. A port 28 is formed in the valve 25 and is designed to be brought into registry with the bore of the tubular member 20 or to be moved out of registry with the bore of this tubular member to block the passage of fluid therethrough.

Manually controllable motion transmission is provided between the valves 5 and 25 for the purpose of opening the valve 25 when the valve 5 is closed and for opening the valve 5 when the valve 25 is closed. This motion transmission mechanism includes a gear wheel 30 fixed to the valve 5 and a gear wheel 31 fixed to the valve 25 and meshing with the gear wheel 30. The gear wheels 30 and 31 are enclosed in a suitable casing 32 having a removable plate, as shown. The valve 5 or the axis of the gear wheel 30 projects exteriorly of the casing 31 and carries an operating lever or finger piece 33 to facilitate manipulation of the valves. Of course, it is to be understood that the ports 9 and 29 are so related with respect to the bores that they control and with respect to each other that when one is opened the other is closed. The gauge 22 may be of any conventional type and has its dial in its top. The dial contains luminous figures and indicia and has a luminous pointer co-acting therewith so that it may be read at night. A transparent and unbreakable crystal is provided to cover the barrel and this crystal may be covered by a protective netting of wire.

When the air chuck has been applied to the valve stem of the tire and the lever 33 turned to open valve 5 and close valve 25, valve 15 having been opened by such application, the air will flow into the tire through the usual valve to which the chuck is applied. When the operator thinks that sufficient air has been admitted to the tire he turns the lever 33 to close the valve 5 and shut off the air supply and to simultaneously open the valve 25 which connects the gauge with the interior of the tire through the hollow coil spring 20 so that a glance at the gauge will disclose the pressure in the tire. The gauge reading is right before the eyes of the operator and is had without removing the chuck from the tire. The facility with which the pressure may be known insures accurate and proper inflation and avoids the blowouts due to overinflation and the deterioration of the tire due to underinflation.

I claim:

In a device of the class described, an air chuck, a gauge mounted on said chuck, an air line leading to said chuck, said chuck having an inlet for cooperation with the barrel of a tire valve, a valve normally closing said inlet and provided with an opening having a hollow stud located therein for unseating the tire valve when the chuck is applied thereto, said chuck inlet-closing valve having means to cooperate with the barrel of the tire valve to open said chuck valve when the chuck is applied, a resilient spiral tubular member communicating at one end with the gauge and extending at its other end into the hollow stud of the tire valve-unseating element to afford direct communication between the pressure in the tire and the gauge and to operate as a spring to yieldably hold the chuck inlet valve seated when the chuck is not in use.

PERRY LEONARD.